United States Patent
Dohles et al.

(10) Patent No.: US 7,458,294 B2
(45) Date of Patent: Dec. 2, 2008

(54) SPINDLE OR WORM DRIVE FOR ADJUSTMENT DEVICES IN MOTOR VEHICLES

(75) Inventors: Dittmar Dohles, Weitramsdorf (DE); Horst Brehm, Hallstadt (DE); Jochen Hofmann, Marktgraitz (DE); Gregor Kröner, Bischberg (DE); Markus Fischer, Itzgrund (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 897 days.

(21) Appl. No.: 10/504,392

(22) PCT Filed: Nov. 18, 2002

(86) PCT No.: PCT/DE02/04282

§ 371 (c)(1),
(2), (4) Date: Aug. 10, 2004

(87) PCT Pub. No.: WO03/068551

PCT Pub. Date: Aug. 21, 2003

(65) Prior Publication Data

US 2005/0126333 A1    Jun. 16, 2005

(30) Foreign Application Priority Data

Feb. 13, 2002  (DE) ............... 102 06 524
Oct. 30, 2002  (DE) ............... 102 50 994

(51) Int. Cl.
*F16H 57/02*  (2006.01)
*B60N 2/02*  (2006.01)
*B60J 1/12*  (2006.01)

(52) U.S. Cl. .................... 74/606 R; 74/89.17; 74/89.34

(58) Field of Classification Search ............... 74/89.14, 74/89.34, 425, 89.17, 606 R; 296/65.1, 311, 296/346; 297/330, 362.11, 362.12, 362.14
See application file for complete search history.

(56) References Cited

U.S. PATENT DOCUMENTS 2,931,424 A * 4/1960 Pickles ................. 248/419

(Continued)

FOREIGN PATENT DOCUMENTS

DE    33 03 198 A1    8/1984

(Continued)

OTHER PUBLICATIONS

International Search Report of PCT/DE2002/04282, dated Mar. 28, 2003.

(Continued)

*Primary Examiner*—William C Joyce
(74) *Attorney, Agent, or Firm*—Christie, Parker & Hale, LLP.

(57) ABSTRACT

A spindle or worm drive for adjustment devices in motor vehicles. The device is secured with a fixed spindle or a fixed toothed rack to the first of two parts which can be adjusted in relation to each other, and is provided with a gear mechanism which is connected to the second of the two parts which can be adjusted in relation to each other. The gear housing is free from backlash and is enclosed by at least one bearing shell such that it is pivotable about at least one axis. The bearing shell consisting of two bearing plates which fit into one another and which can be joined to each other after enclosure of the gear housing. The gear housing is made of plastic and is provided with a concave or convex housing part which is surrounded by a convex or concave bearing shell section made of a material which is suitable for receiving crash forces, especially a metal material.

28 Claims, 9 Drawing Sheets

U.S. PATENT DOCUMENTS

| | | | |
|---|---|---|---|
| 4,802,374 A | 2/1989 | Hamelin et al. | |
| 5,467,957 A | 11/1995 | Gauger | |
| 6,073,893 A | 6/2000 | Koga | |
| 6,322,146 B1 | 11/2001 | Fisher, Jr. | |

FOREIGN PATENT DOCUMENTS

| | | |
|---|---|---|
| DE | 198 61 100 A1 | 2/2000 |
| JP | 9-66761 | 3/1997 |

OTHER PUBLICATIONS

International Preliminary Examination Report of PCT/DE2002/04282, dated Mar. 26, 2004.

Patent Abstract of Japan, Publication 09066761, Published Mar. 11, 1997, in the name of Nemoto.

English translation of International Preliminary Examination Report, dated Mar. 24, 2004, for International Application No. PCT/DE2002/004282; International Filing Date of Nov. 18, 2002.

* cited by examiner

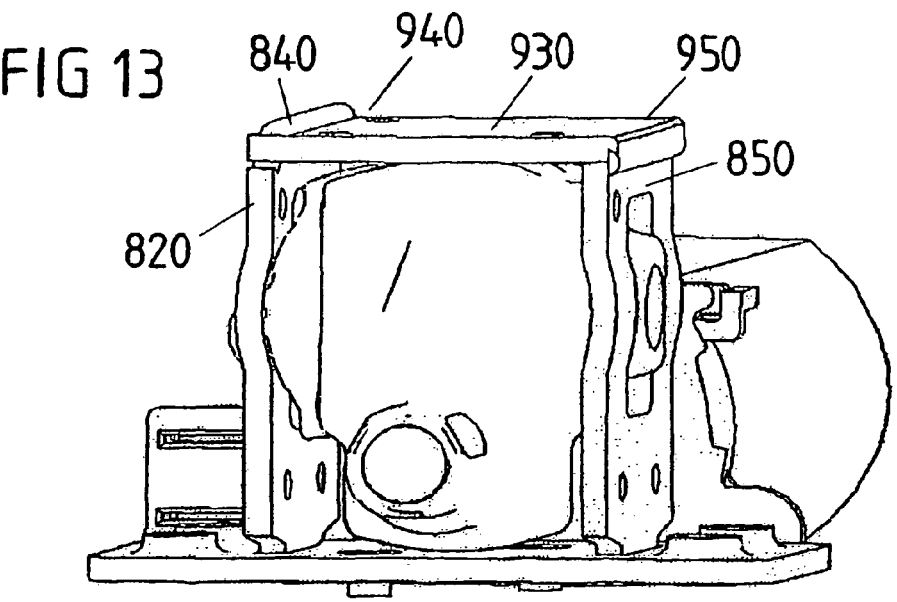
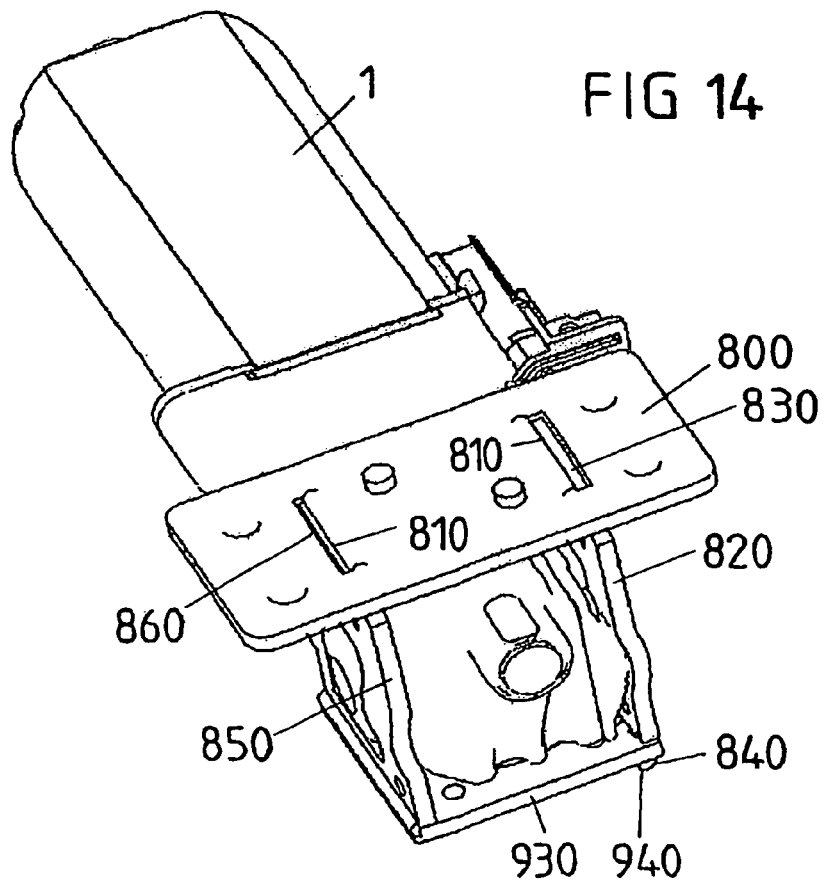

SPINDLE OR WORM DRIVE FOR ADJUSTMENT DEVICES IN MOTOR VEHICLES

CROSS-REFERENCE TO RELATED APPLICATION

This application is a National Phase Patent Application of International Application Number PCT/DE2002/04282, filed on Nov. 18, 2002, which claims priority of German Patent Application Number 102 06 524.1, filed on Feb. 13, 2002, and German Patent Application Number 102 50 994.8, filed on Oct. 30, 2002.

BACKGROUND

The invention relates to a spindle or worm drive for adjustment devices in motor vehicles, more particularly for seat adjustment devices, window lifters and sliding roofs.

From DE 198 61 100 A1 a spindle drive is known for adjustment devices in motor vehicles having a fixed spindle which is fixed on a first of two relatively rotatable parts, a gearing mechanism which is mounted on the second of the relatively rotatable parts, and a gear housing for accommodating the gearing. The gear housing consists of two housing plates which are fixed against each other by means of push-fit connections and which are designed as supporting connecting points where the housing plates are held together and which take up the gear forces. The push-fit connections have raised zones and recesses which fit into each other and initially form a play-fit. The housing plates are fixed by plastically deforming the material in the region of the push-fit connections.

From U.S. Pat. No. 4,802,374 a spindle drive is known for a seat longitudinal adjuster in motor vehicles which contains a spindle which is connected to the adjusting rail of the seat longitudinal adjuster and which can be driven through an electric motor by a spindle nut, worm wheel and a worm connected to a motor shaft. The worm, the worm wheel and the spindle nut are mounted in a retaining clip having two cylindrical sleeves which intersect at right angles. A retaining flange which is connected to the base rail of the seat longitudinal adjuster and consists of a clip with a rectangular window-shaped opening surrounds the cylindrical sleeves of the retaining clip through the frame of the window-shaped opening, and thus secures the position of the retaining clip.

With this spindle drive which is known from U.S. Pat. No. 4,802,374 the tolerances of the individual component parts determine the overall play of the spindle drive so that to reduce the clearance of the spindle drive narrow tolerances have to be set which requires considerable manufacturing expense.

A further drawback of the known spindle drives is that the retaining flange does indeed secure the position of the retaining clip but offers no security in the event of a crash since the retaining flange only surrounds a part of the retaining clip and in the event of a crash is bent so that the coupling between the movable adjusting rail and the base rail fixed on the body is released and thus a vehicle seat connected to the adjusting rail will move uncontrollably.

The object of the present invention is therefore to provide a spindle or worm drive for adjustment devices in motor vehicles of the type already described which guarantees a play-free bearing of the gear elements protected against dirt, a crash-safe connection of the gearing mechanism and thus of the adjustment device as well as a bearing of the gearing mechanism which is able to pivot when necessary about at least one axis.

BRIEF DESCRIPTION

The solution according to the invention provides a play-free bearing of the gearing elements protected against dirt as well as a crash-safe support of the gearing mechanism and thus of the relatively movable parts of the adjustment device as well as a pivotal action of the gearing mechanism for connecting adjustment parts which are able to pivot about an axis.

The solution according to the invention is based on the idea of arranging the gear elements in a gear housing surrounding the gear elements in the form of a capsule protected against dirt and damage and of arranging the gear housing in turn free from backlash and where necessary able to pivot about at least one axis in a bearing shell which is designed and intended to take up the crash forces and thus to ensure a crash-safe support of the gear mechanism so that the relatively movable parts of the adjustment device also remain connected together even in the event of a crash.

The gearing housing preferably consists of plastics while the bearing shell is made from a material, more particularly a metal material, which is suitable for absorbing crash forces. This enables on the one hand a simple manufacture of the gear housing, particularly in an injection casting process with high accuracy in fitting while the crash forces are taken up by the bearing shell which is made of metal so that the gear housing itself does not have to be dimensioned to take up the crash forces since these are distributed over a wide surface area over the gear housing through the bearing shell.

The ability of the gear housing to pivot about an axis, for example about a pivotal axis running perpendicular to the spindle or toothed rack is preferably achieved through a concave or convex housing part of the gear housing and a convex or concave bearing shell section which surrounds the concave or convex housing part.

In an exemplary embodiment of the drive the bearing shell is made in two parts; namely the bearing shell consists of two bearing plates which can be fitted into each other and which can be connected together after the gear housing has been fitted and which can be fixed on the second of the two parts which are adjustable relative to each other.

Making the bearing shell from two bearing plates which can be fitted into each other means that it is easy to fit the bearing shell free from backlash on the gear housing since the bearing plates can be placed around the gear housing, pushed together to zero tolerance and then connected together in this position, for example, by laser welding.

The preferably U-shaped bearing plates can be fitted together engaging in each other by means of the side arms in the direction of the longitudinal extension of the spindle or toothed rack whereby the connecting arms between the side arms have through openings for passing through the spindle or toothed rack, adjoined on each side by the concave or convex bearing shell sections which correspond with the convex or concave housing parts of the gear housing.

This design combines the rotational movement of the gear mechanism inside the bearing shell formed by the bearing plates with a clearance-free connection between the gear housing and the bearing shell with integrated guide of the spindle or toothed rack.

The side arms of the one bearing plate are preferably formed as tabs which engage in the other bearing plate in the one side arm provided with a window-shaped opening and the other side arm provided with a U-shaped recess. To compensate for tolerances, the tab-shaped side arm of the one bearing plate is longer in the connecting direction of the bearing plates than the window-shaped opening of the other bearing plate, and the tab-shaped side arm of the one bearing plate is shorter than the U-shaped recess of the side arm of the other bearing plate whereby the tab-shaped side arm of the one bearing plate can be fitted in the connecting direction of the bearing plates through a cut-out section in the connecting arm of the other bearing plate which widens out the window-shaped opening of the corresponding side arm of the other bearing plate.

Since the tab-shaped side arm of the one bearing plate in the connecting direction of the bearing plates is longer than the window shaped opening and the frame surrounding the window shaped opening is longer than the tab shaped side arm, the fixing points provided at the front ends of the tab shaped side arm in the connecting direction, and the frame surrounding the window-shaped opening are freely accessible for attaching the spindle or worm gearing on one of the two parts which are movable relative to each other.

In order to connect the bearing plates while guaranteeing a play-free coupling with the gear housing the side arms of the bearing plates are positively connected together in the assembled state of the adjustment device, more particularly through welding contours.

In a further exemplary embodiment of the drive the bearing shell is designed in four parts and consists of four bearing plates; where basically the bearing shell has a base plate, two side plates and a top plate, wherein the base plate and the top plate run substantially parallel to each other and are held spaced apart yet connected together through the two side plates which are mounted substantially parallel to each other. With this further special embodiment there is the important advantage that the manufacturing tolerances can be compensated particularly easily since the relative position of the four bearing plates (bearing shell plates) relative to each other can be re-aligned very simply. Thus the freedom from backlash between the gear housing and bearing shell can be adjusted and permanently fixed in a very simple manner.

In the further exemplary embodiment, the base plate optionally has two slot like openings of which one serves to hold a fixing tab of one of the two side plates and the other opening serves to hold the fixing tab of the other of the two side plates.

The one side plate can thereby advantageously have a further fixing tab which is mounted on a side of the side plate opposite the one fixing tab and engages in a recess in the edge of the top plate.

Through openings are advantageously provided in each of the side plates for passing through the spindle or toothed rack.

In order to fix the freedom from backlash between the gear housing and the bearing shell in a particularly secure manner it is regarded as advantageous if the side plates and the gear housing lie close against each other over a wide surface area. This can advantageously be achieved if the side plates have concave and convex bearing shell sections with which the gear housing is fixed.

The through openings in the side plates as well as the concave or convex bearing shell sections can thereby be arranged relative to each other so that the concave and convex bearing shell sections are arranged on each side of the through openings for passing through the spindle or toothed rack.

After the base plate, the two side plates and the top plate have been aligned relative to each other and the freedom from backlash between the gear housing and bearing shell is ensured, the base plate, the two side plates and the top plate can be welded together for fixing. In particular, laser welding is regarded as advantageous for fixing purposes. The welded seams for connecting the bearing plates should thereby lie in grooves which are formed in the connecting regions between the bearing plates which stand on one another.

An advantageous method for manufacturing the spindle and/or worm drive according to the invention includes the gearing elements after their connection with the spindle or toothed rack being inserted into a housing shell of the gear housing and being connected to a drive element of the motor shaft so that a gearing cover is connected to the housing shell of the gear housing to close up the gear mechanism and the finished made gear housing being enclosed free from backlash by a bearing shell.

In the case of a two part drive this can advantageously be fitted so that the bearing plates are pushed from both sides through the full-length openings onto the spindle, so that the side arms of the bearing plates are pushed into each other until the concave or convex bearing shell sections of the bearing plates adjoin without play against the concave and convex housing parts of the gear housing, and so that the abutting side edges of the side arms of the bearing plates are connected together by laser welding, at least over a part of their length.

The one end of the spindle can then be connected to a connecting tab which is fixed on the first of the two relatively rotatable parts and the interconnecting bearing plates can be connected to the second of the relatively rotatable parts.

In the case of a four-part bearing shell, it is regarded as advantageous if this is formed from four bearing plates in that two side plates are set up on a base plate, the gear housing is inserted between the two side plates, a top plate is fitted onto the two side plates and the four bearing plates are aligned without play relative to each other and then fixed together.

The two side plates can advantageously be fitted from both sides through window-shaped full-length openings onto the spindle and then aligned until the concave and convex bearing shell sections of the side plates bear without play against the concave and convex housing parts of the gear housing.

Fixing the four bearing plates can advantageously be carried out by welding, more particularly laser welding. In order to avoid "through welding" when laser welding, the join should be "butt" welded, thus welded at an obtuse angle. Laser welding should thereby be carried out in the grooved areas or in the grooves which are formed in the connecting region of the adjoining bearing plates. It is recommended in this connection if the laser welding is carried out at an angle of about 45° to the bearing plates which are to be connected.

BRIEF DESCRIPTION OF THE DRAWINGS

The invention will now be explained in further detail with reference to the embodiment illustrated in the drawings.

FIG. 13 is a front perspective view showing the finished assembled drive with the top plate of FIG. 12 attached to the bearing plates of FIG. 7-9.

FIG. 14 is top perspective view showing the finished assembled drive of FIG. 13.

DETAILED DESCRIPTION

Figure 1:
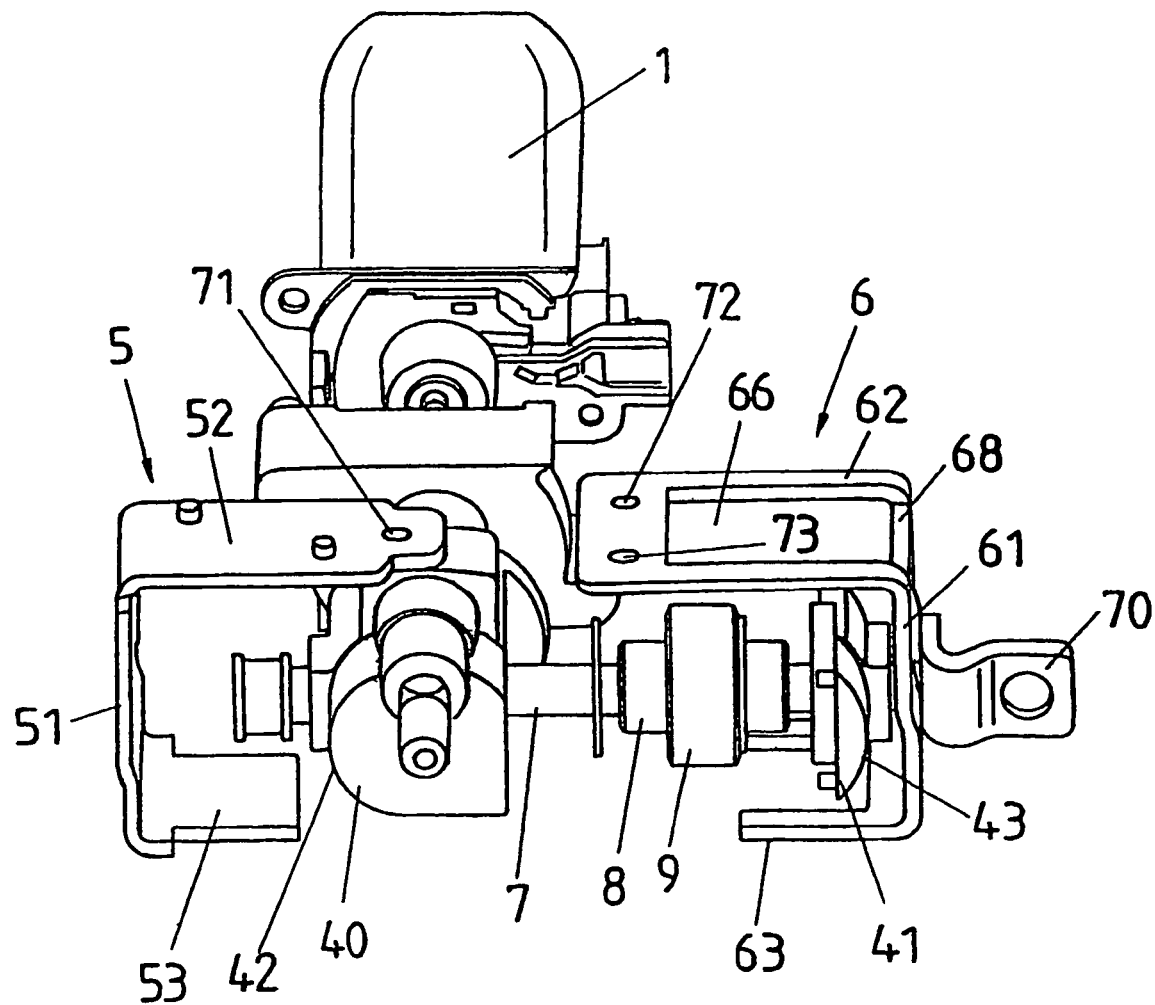
FIG. 1 is a front exploded view of a first exemplary embodiment of a spindle or worm drive with a two part bearing shell.
Figure 2:
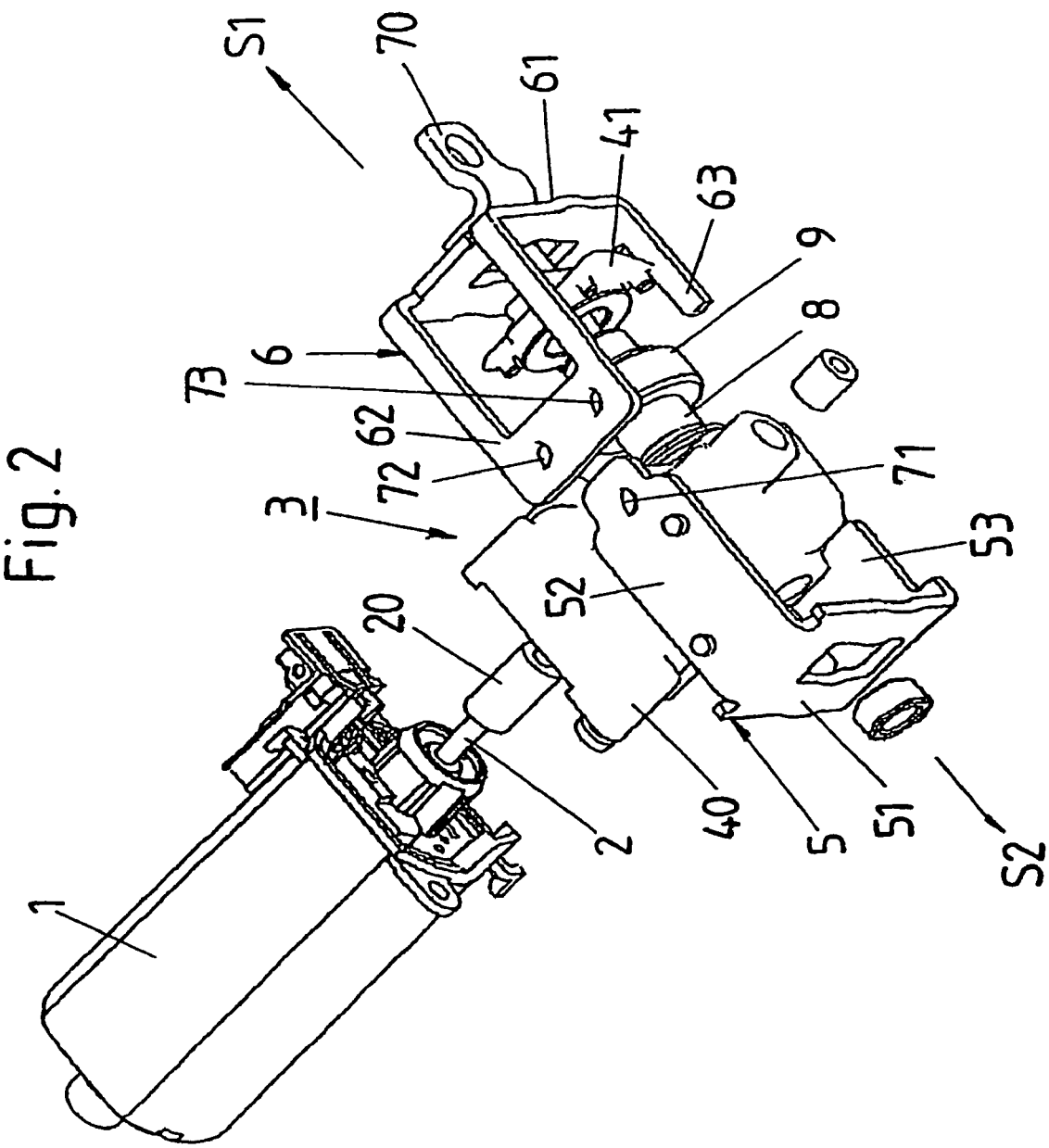
FIG. 2 is top exploded view of the device of FIG. 1.
Figure 3:
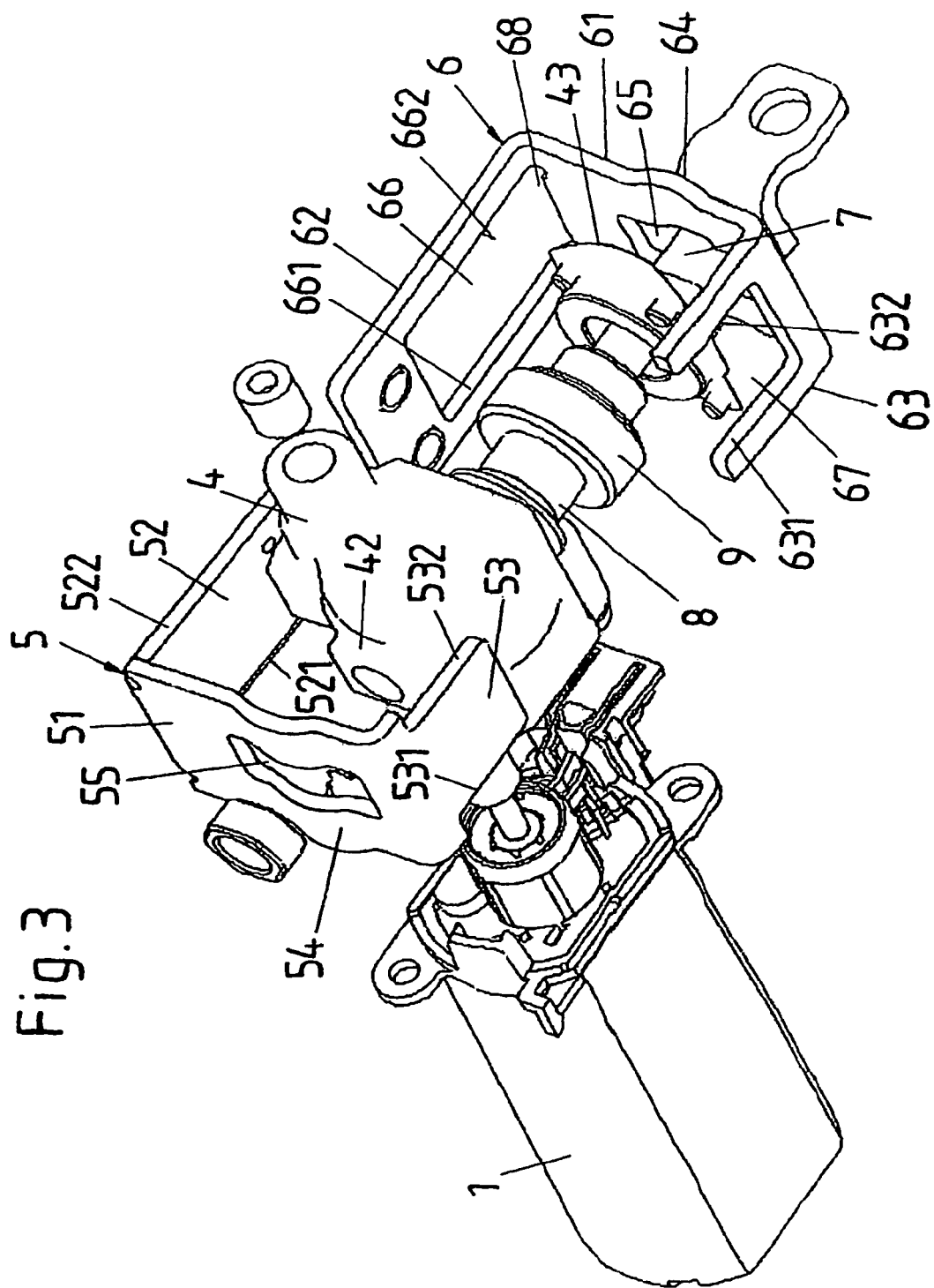
FIG. 3 is bottom exploded view of the device of FIG. 1.

The spindle drive which is shown in exploded views in FIGS. 1 to 3 has an electric motor 1 whose motor shaft 2 is connected to a drive worm 20 which meshes with a worm wheel 9 of a gear mechanism 3. The worm wheel 9 is connected to a spindle nut 8 whose thread meshes with the thread of a spindle 7. Any rotation of the motor shaft 2 is transferred through the drive worm 20 to the worm wheel 9 and thus to the spindle nut 8 which is connected in one piece to the worm wheel 9 so that when the spindle 7 is mounted rotationally secured it changes its position in relation to the motor shaft 2 through the rotation of the spindle nut 8, i.e. is moved in the direction S1 or S2 in relation to the motor shaft 2 according to FIG. 2 depending on the direction of rotation of the electric motor 1.

The gear elements, drive worm 20, spindle 8 and worm wheel 9, are combined into the gear mechanism 3 which has a gear housing 4 which consists of a housing shell 40 and a housing cover 41 which after inserting the gear elements 8, 9, 20 into the housing shell 40 is connected to the housing shell 40.

Two U-shaped bearing plates 5, 6 are fitted onto the ends of the spindle 7 projecting out from the gear housing 4, wherein the side arms 52, 53 and 62, 63 of these bearing plates are aligned opposite one another and their connecting arms 51, 61 which connect the side arms 52, 53 and 62, 63 together have window-shaped through openings 55, 65 for receiving the spindle 7. The side arms 52, 53, and 62, 63 are thus designed so that they can engage in each other with slight play and thereby produce a positive connection which has a certain play. For this purpose the one bearing plate 5 has two side arms 52, 53 designed as tabs, while the one side arm 62 of the other bearing plate 6 has a rectangular window-shaped opening 66 while the other side arm 63 is designed U or clip-like and has a corresponding recess 67.

If the two bearing plates 5, 6 are inserted in each other then the tab-shaped side arms 52, 53 of the one bearing plate 5 substantially fill out the window shaped opening 66 or the recess 67 of the side arms 62, 63 of the other bearing plate 6. For compensating tolerances either the tab-shaped side arms 52, 53 of the one bearing plate 5 in the joining direction of the bearing plates 5, 6 are either slightly shorter than the length of the window-shaped opening 66 or recess 67 of the side arms 62, 63 of the other bearing plate 6, or the tab-shaped side arm 52 of the one bearing plate is longer than the window-shaped opening 66 of the side arm 62 on the other bearing plate 6 and in the connecting direction of the bearing plates 5, 6 can be fitted through a cut out section 68 in the connecting arm 61 of the other bearing plate 6 which widens out the window shaped opening 66 of the corresponding side arm 62 of the other bearing plate 6 so that the tab shaped side arm 52 of the bearing plate 5 can project through the window shaped opening 66 and thus through the connecting arm 61 of the other bearing plate 6, or the frame of the side arm 62 surrounding the window shaped opening 66 over the connecting arm 51 of the bearing plate 5, as can be seen from the illustration in FIG. 6. After connecting the bearing plates 5, 6 into the bearing shell the fixing points 71, 72, 73 provided at the ends of the upper side arms 52, 62 of the bearing plates 5, 6 and projecting over the relevant connecting arms 51, 61 of the other bearing plate 5, 6 are accessible for fixing the spindle or worm gearing on the one of the two relative movable parts.

In the region of the window-shaped spindle passages 55, 56 through the bearing plates 5, 6 the connecting arms 51, 61 have in relation to the gear housing 4 concave curvatures 54, 64 which correspond to convex housing sections 42, 43 of the gear housing 4, i.e. the housing shell 40 and the housing cover 41. The curvatures 42, 43 of the gear housing 4 and the curvatures 54, 64 of the connecting arms 51, 61 correspond with each other so that the gear mechanism 3 can swivel inside the bearing shell formed from the bearing plates 5, 6 about an axis running parallel to the motor shaft 2 and thus can compensate pivotal movements of the parts which are movable relative to each other, of which one part is connected through a fixing tab 70 to the spindle 7 and the other of the two relatively movable parts is connected through the fixing points 71, 72, 73 to the bearing shell which is formed by the bearing plates 5, 6.

In order to assemble the spindle or worm drive the gear elements, namely the worm wheel 9 and the spindle nut 8, after their connection with the spindle 7, they are inserted into the housing shell 40 of the gear housing 4 and are connected to the worm 20 which is attached to the motor shaft 2. After fitting the housing cover 41 onto the housing shell 40 and connecting it to the gear housing 4 the gear mechanism 3 is complete. The bearing plates 5, 6 are then pushed from both sides via the window shaped through openings 55, 65 onto the spindle 7 and the side arms 52, 53; 62, 63 of the bearing plates 5, 6 are pushed into each other and the concave and convex bearing shell sections 54, 64 of the bearing plates 5, 6 bear without play against the concave and convex housing parts 42, 43 of the gear housing 4. Finally the abutting side edges 521, 522, 661, 662; 531, 532, 671, 672 of the side arms 52, 62 and 53, 63 of the bearing plates 5, 6 are connected together by means of laser welding which run as welding contours 74, 75, 76 at least over a part of the length of the side edges 521, 522, 661, 662; 531, 532, 671, 672.

In order to connect the spindle or worm drive to the adjusting drive the one end of the spindle 7 is connected to the fixing tab 70 which is fixed on the first of the two relatively movable parts while the bearing plates 5, 6 which are connected together to form the bearing shell are connected to the second of the relatively movable parts.

Figure 4:
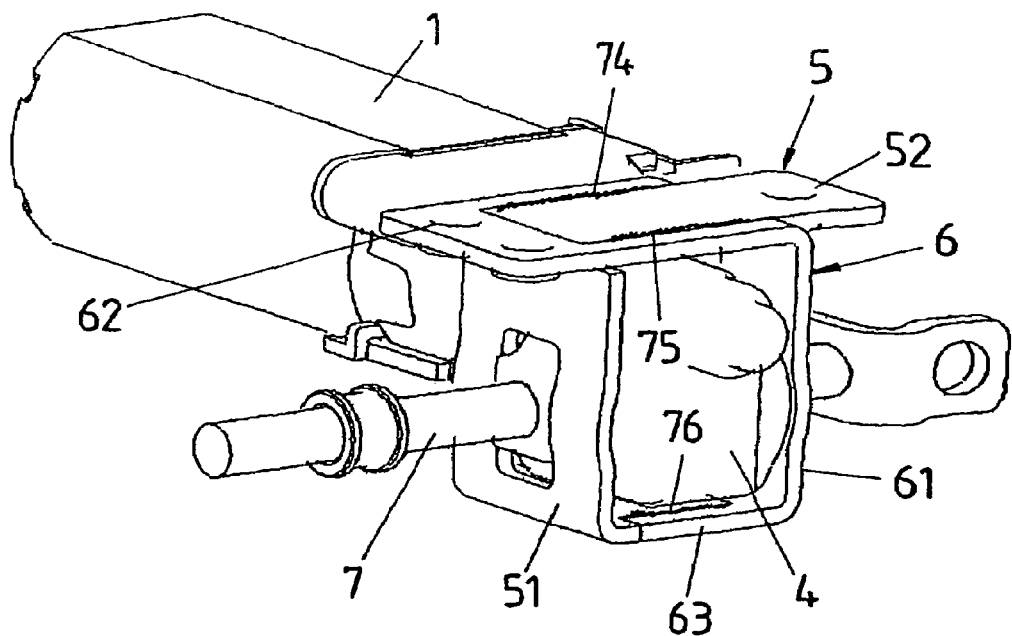
FIG. 4 is front left perspective view of the device of FIG. 1 in its assembled state.
Figure 5:
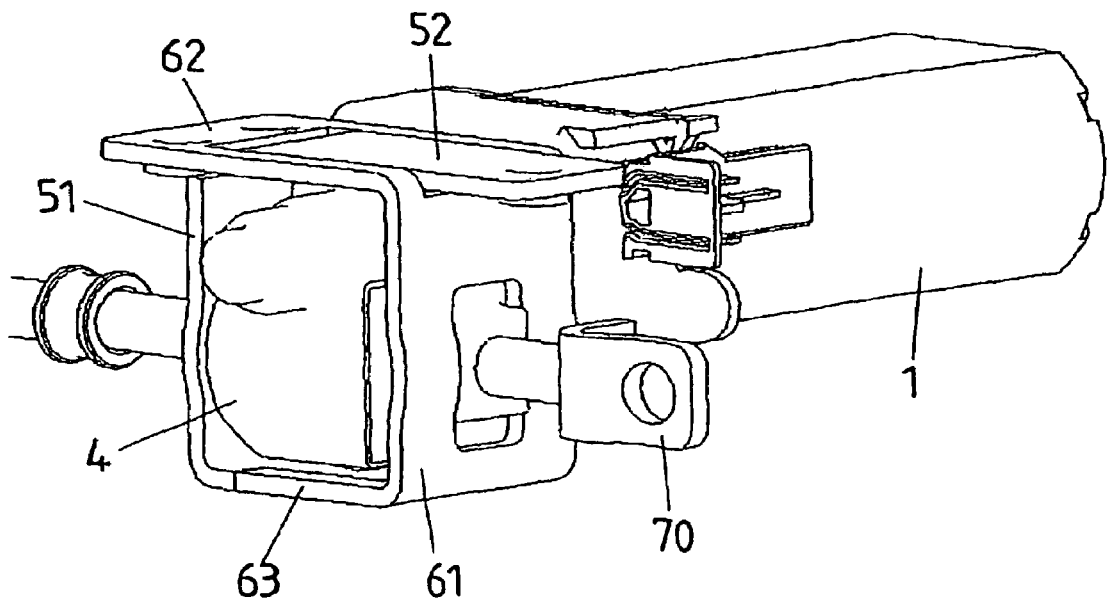
FIG. 5 is front right perspective view of the device of FIG. 1 in its assembled state.
Figure 6:
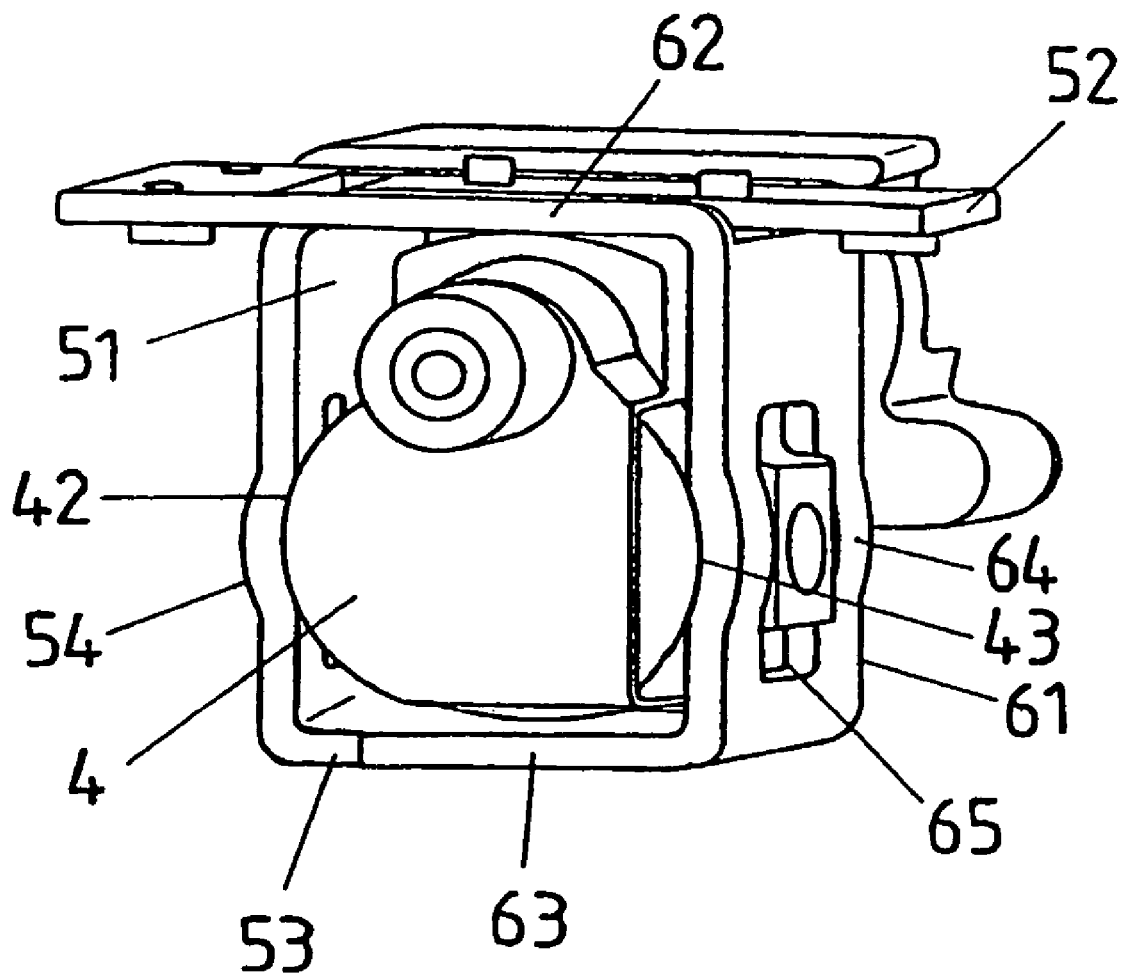
FIG. 6 is front perspective view of the device of FIG. 1 in its assembled state.

In the assembled state of the gear mechanism 3 and the bearing shell formed from the bearing plates 5, 6 as illustrated in FIGS. 4 to 6, the side edges 521, 522 and 531, 532 of the tab-shaped side arms 52, 53 of the one bearing plate 5 are located adjoining the inner side edges 661, 662 and 671, 672 of the window shaped opening 66 and recess 67 respectively of the side arms 62, 63 of the other bearing plate 6. As can be seen from the perspective illustrations of the assembled drive according to FIG. 4 to 6, the ends of the tab-shaped side arm 52 of the one bearing plate 5 and of the end of the side arm 62 of the other bearing plate 6 defining the window shaped opening 66 project over the relevant connecting arms 51, 61 of the relevant other bearing plate 5, 6 and enable a corresponding match to the dimensions of the gear housing 4 in the connecting region so that a play-free connection between the gear mechanism 3 and the bearing shell 5, 6 is guaranteed.

An embodiment for a drive according to the invention is shown in FIGS. 7 to 16 where the bearing shell consists of four bearing plates.

Figure 7:
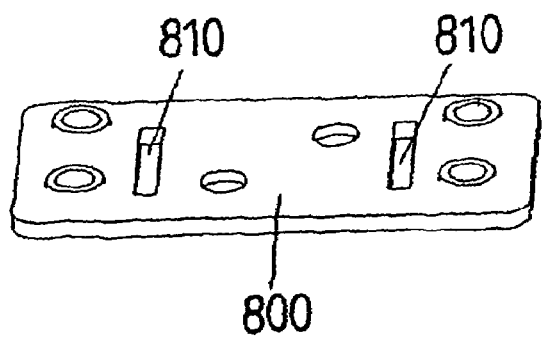
FIGS. 7-9 are front perspective views of three of four base plates used to form bearing shell with four bearing plates for a second exemplary embodiment of a spindle or worm drive with a four part bearing shell.
Figure 8:
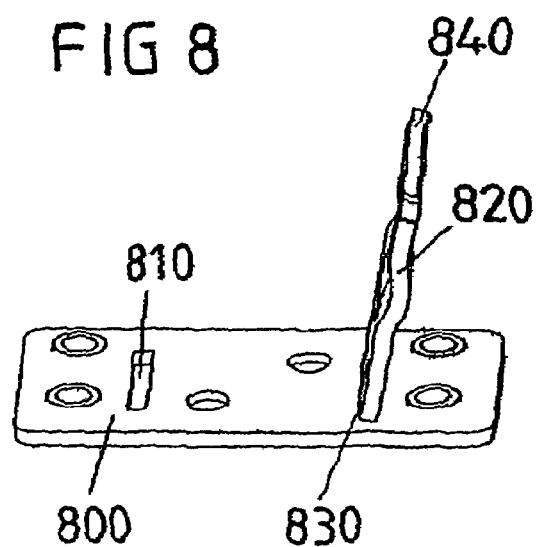

In FIG. 7 a base plate 800 is shown which has two slit like openings 810. A side plate 820 with a fixing tab 830 is pushed into one of the two slit like openings 810 of the base plate 800; this is shown in detail in FIG. 8. The side plate 820 furthermore has a further fixing tab 840 which is described further below in connection with the fixing of the side plate 820 on a top plate.

Figure 9:
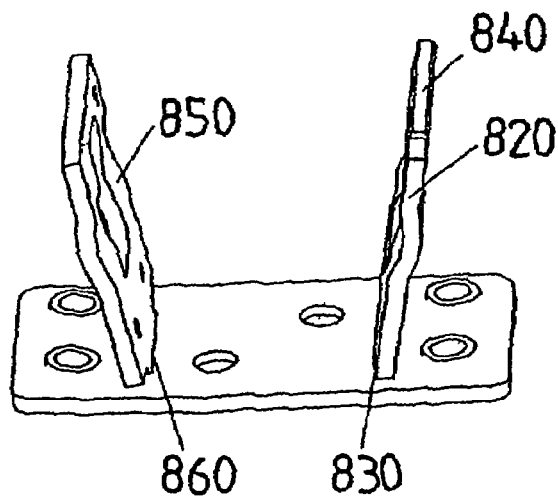

In the illustration according to FIG. 9 a second side plate 850 is pushed by its fixing tab 860 onto the base plate 800. It can be seen in FIG. 9 that the width of the slit like openings 810 is slightly larger than the width of the associated fixing tabs 830 and 860 so that the two side plates 820 and 850 have a slight clearance and thus are fixed easily movable on the base plate 800.

Figure 10:
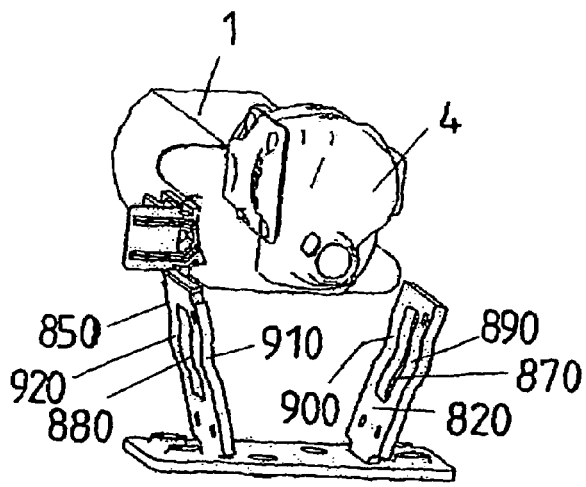
FIGS. 10-11 are front perspective views showing how a spindle or worm drive is connected with the bearings plates shown in FIG. 9.
Figure 11:
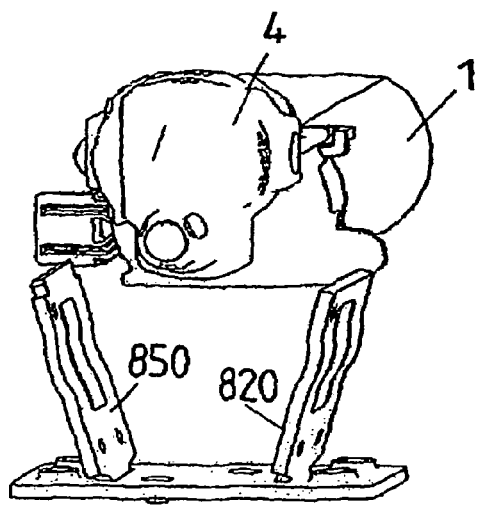

FIGS. 10 and 11 show how the gear housing 4 already described in further detail above in connection with FIGS. 1 to 6 is inserted with the electric motor 1 into the arrangement which comprises the base plate 800 and the two side plates 820 and 850. FIG. 10 thereby shows a view from inclined left and FIG. 11 shows a view from inclined right.

Furthermore it can be seen in FIGS. 10 and 11 that each of the two side plates 820 and 850 each has a through opening 870 and 880. Left and right of the through openings 870 and 880—thus on both sides of the through openings 870 and 880—each of the two side plates 820 and 850 each has two concave and convex bearing shell sections 890, 900, 910 and 920. The through openings 870 and 880 serve for passing through the spindle 7 which is shown in further detail for example in FIG. 1 and which is described above in connection with FIG. 1.

Figure 12:
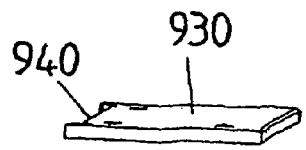
FIG. 12 is a front perspective view of a top plate.

In FIG. 12 a top plate 930 is shown which has a recess 940 along the edge. The edge recess 940 serves—as described in detail further down in connection with FIGS. 13 to 16—to receive the further fixing tab 840 of the one side plate 820.

FIGS. 13 and 14 show the finished assembled drive after the gear housing 4 has been inserted between the two side plates 820 and 850. In particular it can be seen easily from FIG. 13 how the concave and convex bearing shell sections 890, 900, 910 and 920 bear 30 without clearance against the gear housing 4 which has a concave shape in the fixing area. In FIG. 13 it can further be seen how the top plate 930 is fixed on the two side plates 820 and 850. Also seen is the further fixing tab 840 of the one side plate 820 which engages in the recess 940 along the edge of the top plate 930. On the side 950 of the top plate 930 opposite the edge recess 940 the top plate 930 rests on the second side plate 850.

FIG. 14 shows the assembled drive from the back. It is possible to see the electric motor 1 and the base plate 800 as well as the slit like openings 810 into which the fixing tab 830 of the one side plate 820 as well as the fixing tab 860 of the second side plate 850 engage. Furthermore it is possible to see how the further fixing tab 840 of the one side plate 820 engages in the edge recess 940 of the top plate 930.

Figure 15:
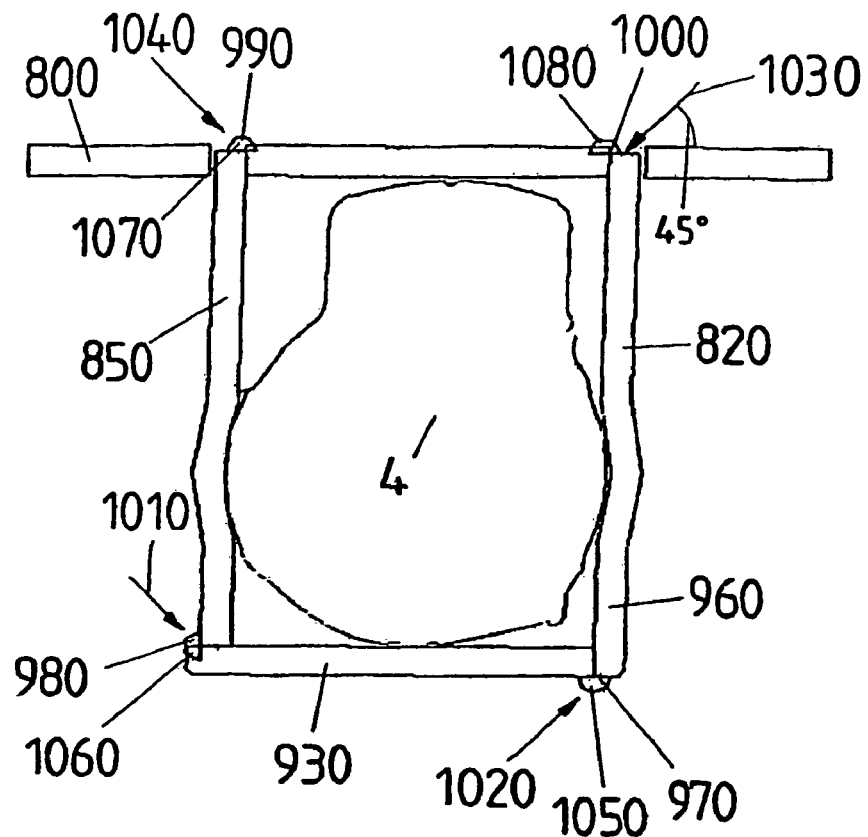
FIG. 15 is a detail showing how the four bear plates of FIGS. 13 and 14 are connected and fixed together.
Figure 16:
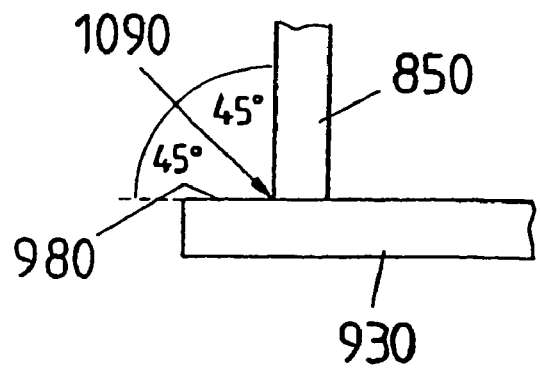
FIG. 16 is a detail showing the connection between a second side plate and a top plate of FIG. 15.

FIGS. 15 and 16 show in detail how the four bearing plates 800, 820, 850 and 930 are connected and fixed together after the gear housing 4 has been inserted into the bearing shell 960 which is formed by these bearing plates. In the connecting regions between the bearing plates 800, 820, 850 and 930 there are grooved zones or grooves which carry the reference numerals 970, 980, 990 and 1000 in FIG. 15. The four bearing plates are thereby welded together in these grooved zones 970, 980, 990 and 1000, thus through "grooved seam welding". Grooved seam welding has the advantage over welding along the butt joints between adjoining connecting parts that no full penetrating welding passes through the seam point.

FIG. 15 also contains arrows 1010, 1020, 1030 and 1040 which are to represent the welding direction of a welding laser beam. It can be seen that the welding direction of the laser beam stands at an angle of about 45° to the bearing plates which are to be connected together. A particularly solid welding seam is formed by an angle of about 45°. The welding seams thus formed carry the reference numerals 1050, 1060, 1070 and 1080 in FIG. 15.

In FIG. 16 the connection between the second side plate 850 and the top plate 930 is shown once more in detail. The groove 980 is shown into which the laser beam 1090 is directed. The laser beam 1090 thereby has an angle of about 45° to the second side plate 850 as well as an angle of about 45° to the top plate. "Full penetrating welding" can thus not occur.

The invention claimed is:

1. A spindle or worm drive for adjustment devices in motor vehicles, with at least one of a fixed spindle and a fixed toothed rack which is fixed on a first of two parts which can be moved relative to a second of the two parts, with a gear mechanism which is connected to the second of the relatively movable parts, and with a gear housing for receiving the gear mechanism, wherein the gear housing is enclosed free from backlash and able to pivot about at least one axis by a bearing shell, and wherein the gear housing has at least one of a concave and convex housing part which is surrounded by at least one of a convex and concave bearing shell section, wherein the bearing shell section is formed from at least two bearing plates which each bear and are fixed free from backlash against the gear housing and surround the gear housing, wherein the at least two bearing plates of the bearing shell section comprise two interfitting bearing plates which after inserting the gear housing are connected together and fixed on the second of the relatively movable parts, and wherein the bearing plates are fitted in each other in the direction of the longitudinal extension of one of the spindle and toothed rack and have through openings for passing therethrough one of the spindle and toothed rack.

2. The spindle or worm drive according to claim 1, wherein the gear housing is made from plastics and the bearing shell is made from a material which is suitable to take up crash forces.

3. The spindle or worm drive according to claim 1, wherein the bearing plates are U-shaped and have side arms that engage in each other and have connecting arms which connect the side arms together and have through openings for passing therethrough one of the spindle and toothed rack, and have concave and convex curvatures.

4. The spindle or worm drive according to claim 3, wherein the concave and convex bearing shell sections are arranged on both sides of the through openings for passing therethrough one of the spindle and toothed rack.

5. The spindle or worm drive according to claim 3, wherein the side arms of one bearing plate are designed as tabs which engage in the one side arm provided with a window shaped opening and in the other side arm of the other bearing plate provided with a U-shaped recess.

6. The spindle or worm drive according to claim 5, wherein the tab shaped side arm of the one bearing plate in the connecting direction of the bearing plates is shorter than the U-shaped recess of the side arm of the other bearing plate and the tab-shaped side arm of the one bearing plate in the connecting direction of the bearing plates can be pushed through a cut-out section in the connecting arm of the other bearing plate which widens out the window shaped opening of the corresponding side arm of the other bearing plate.

7. The spindle or worm drive according to claim 6, wherein the tab shaped side arm of the one bearing plate in the connecting direction of the bearing plates is longer than the window shaped opening and the frame surrounding the window shaped opening is longer than the tab-shaped side arm so that at the front ends of the tab shaped side arm of the one bearing plate in the connecting direction of the bearing plates and on the frame surrounding the window shaped opening there are freely accessible fixing points.

8. The spindle or worm drive according to claim 6, wherein the side arms of the bearing plates in the assembled state of the adjusting device are positively connected together.

9. The spindle or worm drive according to one of claims 1 to 2, wherein the bearing shell has a base plate, two side plates and a top plate, whereby the base plate and the top plate are arranged substantially parallel to each other and are connected together through the side plates which are arranged substantially parallel to each other.

10. The spindle or worm drive according to claim 9, wherein the base plate has two slit like openings of which one opening serves to receive a fixing tab of one of the two side plates and of which the other opening serves to receive a fixing tab of the other of the two side plates.

11. The spindle or worm drive according to claim 10, wherein the one side plate has a further fixing tab which is mounted on a side of the side plate opposite the one fixing tab and engages in a recess in the edge of the top plate.

12. The spindle or worm drive according to claim 9, wherein the side plates have in the direction of the longitudinal extension of one of the spindle and toothed rack full length openings for passing therethrough one of the spindle and toothed rack.

13. The spindle or worm drive according to claim 9, wherein the side plates have one of concave and convex bearing shell sections.

14. The spindle or worm drive according to claim 13, wherein one of the concave and convex bearing shell sections are arranged on both sides of the full-length openings for passing therethrough one of the spindle and toothed rack.

15. The spindle or worm drive according to claim 9, wherein the base plate, the two side plates and the top plate are welded for fixing.

16. The spindle or worm drive according to claim 15, wherein the plates are laser-welded.

17. The spindle or worm drive according to claim 16, wherein the welded seams lie in grooves which are formed at the connecting regions between plates standing on each other.

18. The spindle or worm drive according to claim 9, wherein the side arms of the bearing plates are connected together through welding contours.

19. The spindle or worm drive according to claim 1, wherein the bearing shell is made from a metal material which is suitable to take up crash forces.

20. A method for manufacturing a spindle or worm drive for adjustment devices in motor vehicles, with at least one of a fixed spindle and a fixed toothed rack which is fixed on a first of two parts which can be moved relative to a second of the two parts, with a gear mechanism which is connected to the second of the relatively movable parts, and with a gear housing for receiving the gear mechanism, wherein the gear housing is enclosed free from backlash and able to pivot about at least one axis by a bearing shell,
wherein gear elements after their connection with one of the spindle and toothed rack are inserted into a housing shell of the gear housing and are connected to a drive element of a motor shaft, wherein a gear cover is connected to the housing shell of the gear housing to close up the gear mechanism, wherein the finished made gear housing is enclosed free from backlash by the bearing shell, wherein as gear housing is used a housing having at least one of a concave and convex housing part, and the bearing shell has at least a convex and concave bearing shell section, and wherein the gear housing is surrounded by the bearing shell in that at least two bearing plates of the bearing shell are adjusted and fixed without play relative to the gear housing, and
wherein the bearing plates are pushed from both sides through window-shaped through openings onto the spindle, side arms of the bearing plates are pushed into each other until the concave and convex bearing shell sections of the bearing plates bear free from backlash against the concave and convex housing parts of the gear housing, and wherein abutting side edges of the side arms of the bearing plates are connected together by laser welding at least over a part of their length.

21. The method according to claim 20, wherein one end of the spindle is connected to a connecting tab which is fixed on the first of the two relatively movable parts, and the bearing plates which are connected together are connected to the second of the relatively movable parts.

22. The method according to claim 21, wherein the bearing shell is formed from four bearing plates in which two side plates are pushed onto a base plate, the gear housing is inserted between the two side plates, and a top plate is fitted onto the two side plates and the four bearing plates are aligned relative to each other free from backlash and fixed together.

23. The method according to claim 22, wherein the two side plates are pushed from both sides through window shaped full-length openings onto the spindle and aligned until the concave and convex bearing shell sections of the side plates bear free from backlash against the concave and convex housing parts of the gear housing.

24. The method according to claim 23, wherein the four bearing plates are fixed together by laser welding.

25. The method according to claim 24, wherein the laser welding is carried out in groove zones which are formed in the connecting region of the bearing plates which stand on each other.

26. The method according to claim 25, wherein the laser welding is carried out at an angle of about 45° to the bearing plates which are to be connected.

27. The method according to claim 23, wherein the four bearing plates are fixed together by welding.

28. A spindle or worm drive for adjustment devices in motor vehicles, with at least one of a fixed spindle and a fixed toothed rack which is fixed on a first of two parts which can be moved relative to a second of the two pads, with a gear mechanism which is connected to the second of the relatively movable parts, and with a gear housing for receiving the gear mechanism, wherein the gear housing is enclosed free from backlash and able to pivot about at least one axis by a bearing shell, and
wherein the gear housing has at least one of a concave and convex housing part which is surrounded by at least one of a convex and concave bearing shell section,
wherein the bearing shell section is formed from at least two bearing plates which each bear and are fixed free from backlash against the gear housing and surround the gear housing, and
wherein the at least two bearing plates of the bearing shell section comprise a base plate, two side plates and a top plate, whereby the base plate and the top plate are arranged substantially parallel to each other and are connected together through the side plates which are arranged substantially parallel to each other.

* * * * *

UNITED STATES PATENT AND TRADEMARK OFFICE
CERTIFICATE OF CORRECTION

PATENT NO. : 7,458,294 B2  Page 1 of 1
APPLICATION NO. : 10/504392
DATED : December 2, 2008
INVENTOR(S) : Dittmar Dohles et al.

It is certified that error appears in the above-identified patent and that said Letters Patent is hereby corrected as shown below:

Column 10, line 49, Claim 28      Delete "pads",
                                  Insert --parts--

Signed and Sealed this

Sixth Day of October, 2009

David J. Kappos
*Director of the United States Patent and Trademark Office*